(12) United States Patent
Li et al.

(10) Patent No.: US 12,345,911 B1
(45) Date of Patent: Jul. 1, 2025

(54) DISPLAY DEVICE INCLUDING POLARIZING BEAM SPLITTER, SUB-REFLECTIVE ELEMENTS, REFLECTIVE POLARIZER, AND REFLECTIVE DISPLAY UNIT

(71) Applicant: Himax Display, Inc., Tainan (TW)

(72) Inventors: Yuet-Wing Li, Tainan (TW); Kuan-Yu Chen, Tainan (TW); Chi-Wen Lin, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 18/822,423

(22) Filed: Sep. 2, 2024

Related U.S. Application Data

(60) Provisional application No. 63/636,117, filed on Apr. 19, 2024.

(51) Int. Cl.
*F21V 8/00* (2006.01)
*G02F 1/1335* (2006.01)
*G02F 1/13357* (2006.01)

(52) U.S. Cl.
CPC ......... *G02B 6/0056* (2013.01); *G02B 6/0018* (2013.01); *G02B 6/0055* (2013.01);
(Continued)

(58) Field of Classification Search
CPC .. G02B 6/0036; G02B 6/0056; G02B 6/0088; G02B 6/009; G02B 6/0091; G02F 1/133616
See application file for complete search history.

(56) References Cited

U.S. PATENT DOCUMENTS 9,341,883 B2  5/2016  Li et al.
2008/0252823 A1* 10/2008 Hwang ............. G02F 1/133555
362/19

(Continued)

FOREIGN PATENT DOCUMENTS

KR   20140053497 A  * 5/2014  .......... G02B 5/0231

OTHER PUBLICATIONS

Olof Bryngdahl, "Polarization-Grating Moir(e)*," J. Opt. Soc. Am. 62, 839-848 (1972) (Year: 1972).*

(Continued)

*Primary Examiner* — Keith G. Delahoussaye
(74) *Attorney, Agent, or Firm* — JCIPRNET (57) ABSTRACT

An embodiment of the invention provides a display module including a plurality of light sources, a light guide plate, a reflective element, a reflective display unit, and a reflective polarizer. The light sources are configured to provide a plurality of illumination beams. The light guide plate has a first surface, a second surface, and a plurality of incident surfaces. The illumination beams enter the light guide plate through the incident surfaces. The reflective element is configured to change a propagation direction of at least one part of the illumination beams. The reflective element includes a plurality of reflective surfaces, and the reflective surfaces reflect the illumination beams having a first polarization direction. The reflective display unit is capable of modulating a polarization state of the illumination beams to form modulated beams. The reflective polarizer filters the modulated beams into an image beam.

12 Claims, 7 Drawing Sheets

(52) U.S. Cl.
CPC ........... *G02B 6/0088* (2013.01); *G02B 6/009* (2013.01); *G02B 6/0091* (2013.01); *G02F 1/133524* (2013.01); *G02F 1/133615* (2013.01); *G02F 1/133616* (2021.01)

(56) References Cited

U.S. PATENT DOCUMENTS

| | | | |
|---|---|---|---|
| 2020/0116921 A1* | 4/2020 | Hattori | G02B 6/0055 |
| 2021/0356642 A1* | 11/2021 | Yao | G02B 6/0073 |
| 2022/0035089 A1* | 2/2022 | Arazi | G02F 1/136277 |

OTHER PUBLICATIONS

Q. Song, Y. Wang, F. Vogelbacher, Y. Zhan, D. L. Zhu, Y. J. Lan, W. Z. Fang, Z. M. Zhang, L. Jiang, Y. L. Song, M. Z. Li, Moiré Perovskite Photodetector toward High-Sensitive Digital Polarization Imaging. Adv. Energy Mater. 2021, 11, 2100742. https://doi.org/10.1002/aenm.202100742 (Year: 2021).*

* cited by examiner

DISPLAY DEVICE INCLUDING POLARIZING BEAM SPLITTER, SUB-REFLECTIVE ELEMENTS, REFLECTIVE POLARIZER, AND REFLECTIVE DISPLAY UNIT

CROSS-REFERENCE TO RELATED APPLICATION

This application claims the priority benefits of U.S. provisional application Ser. No. 63/636,117, filed on Apr. 19, 2024. The entirety of the above-mentioned patent application is hereby incorporated by reference herein and made a part of this specification.

BACKGROUND

Technical Field

The invention relates to a display module.

Description of Related Art

In the display region of a display device, various types of spatial light modulators are applied to convert an illumination beam into an image beam, for example, transmissive liquid crystal display (LCD) panels, liquid-crystal-on-silicon (LCOS) panels, or digital micro-mirror devices (DMDs). The light efficiency of a transmissive LCD panel is less than that of a LCOS panel, and the cost of a DMD is greater than that of a LCOS panel.

Generally, in a projector using the LCOS panel, an s-polarized beam is reflected by a polarizing beam splitter (PBS) to the LCOS panel. Then, the LCOS panel modulates the s-polarized beam into a polarized beam with other polarization states, and reflects the polarized beam to the PBS. The PBS filters the polarized beam into an image beam, which is then transmitted to an image-forming lens. Finally, the image-forming lens projects the image beam onto a screen to form an image on the screen or forms a virtual image in the air or on any other virtual image plane.

However, current front lit micro display suffered from low brightness issue. It is found that the absolute brightness is not high enough to power up the diffractive type AR combiner.

SUMMARY

The invention is directed to a display module, which could provide higher brightness.

An embodiment of the invention provides a display module including a plurality of light sources, a light guide plate, a reflective element, a reflective display unit, and a reflective polarizer. The light sources are configured to provide a plurality of illumination beams. The light guide plate has a first surface, a second surface opposite to the first surface, and a plurality of incident surfaces connecting the first surface and the second surface. The illumination beams enter the light guide plate through the incident surfaces. The reflective element is connected to the light guide plate and configured to change a propagation direction of at least one part of the illumination beams. The reflective element is a polarizing beam splitter (PBS) film and includes a plurality of reflective surfaces, and the reflective surfaces reflect the illumination beams having a first polarization direction. The reflective display unit is capable of modulating a polarization state of the illumination beams to form modulated beams. The second surface being disposed between the reflective display unit and the first surface. The first surface is disposed between the second surface and the reflective polarizer. The reflective polarizer filters the modulated beams into an image beam. The reflective element includes a plurality of sub-reflective elements arranged along a second direction. The sub-reflective elements are embedded within the light guide plate or disposed on the first surface, where the second direction is a direction from the reflective display unit toward the reflective polarizer.

In view of the above, the display module in the embodiments includes a plurality of light sources, the light sources are configured to provide a plurality of illumination beams, and the illumination beams enter the light guide plate through the incident surfaces. That is, the display module is provided at least two light sources to illuminate the same display area. Thus, the absolute brightness of the display module could be higher. Moreover, since one light source and its opposite light source play a role of reflector to each other, the light efficiency of the display module are also improved. Furthermore, since the light efficiency of the display module/light source is higher, the power of the display module/light source could be decreased (because the higher light efficiency, the lower power), so that the thermal management of the display module is also improved.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
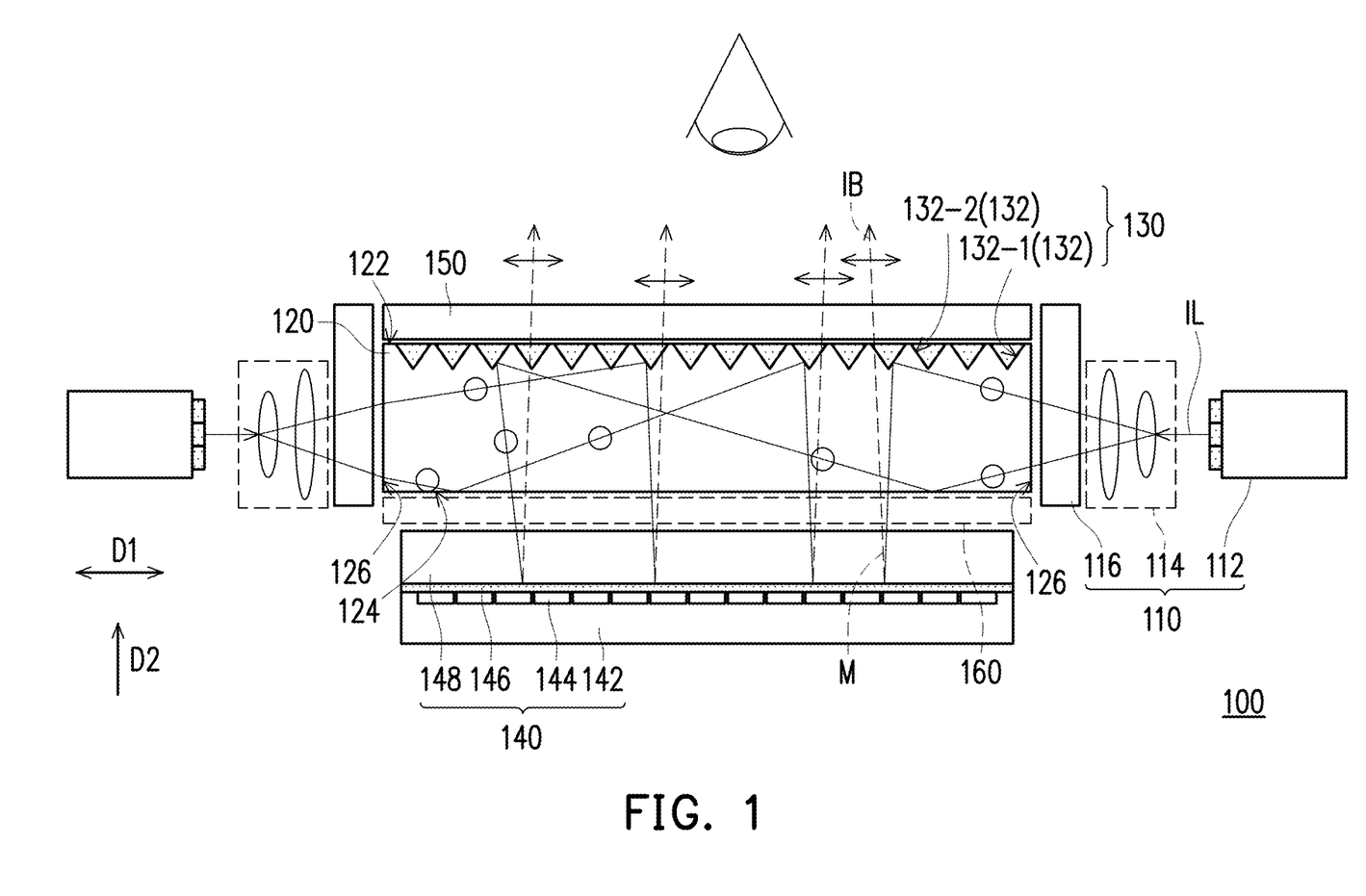
FIG. 1 is a schematic cross-sectional view of a display module according to a first embodiment of the invention.

FIG. 1 is a schematic cross-sectional view of a display module according to a first embodiment of the invention. Referring to FIG. 1, the display module 100 in this embodiment includes a plurality of light sources 110, a light guide/waveguide plate 120, a reflective element 130, a reflective display unit 140, and a reflective polarizer 150.

In this embodiment, the light sources 110 are configured to provide a plurality of illumination beams IL. Specifically, each light source 110 may include light-emitting device 112, a coupling lens 114, and a polarizer 116. The coupling lens 114 is disposed between the light-emitting device 112 and polarizer 116, and the polarizer 116 is disposed between the coupling lens 114 and incident surface 126. The light-emitting device 112 is configured to emit a light beam. For example, the light-emitting device 112 may be a light-emitting diode (LED) or a laser diode (LD), and the light beam may be a red, green, blue or white light beam, but the invention is not limited thereto. The coupling lens 114 is configured to split the light beam into a plurality of lights. The coupling lens 114 is, for example, a combination including one or a plurality of optical lenses having a diopter. The optical lens includes, for example, various combinations of non-planar lenses such as a bi-concave lens, a bi-convex lens, a concave-convex lens, a convex-concave lens, a plano-convex lens, a plano-concave lens, and a lens array. The invention does not limit the configuration and the type of the coupling lens 114. The polarizer 116 is configured to allow lights having certain polarization to pass through and reflect/filter lights having other polarization to form the illumination beams IL. The polarizer 116, for example, is wire grid polarizing film, but the invention is not limited thereto.

In this embodiment, the light guide plate 120 has a first surface 122, a second surface 124 opposite to the first surface 122, and a plurality of incident surfaces 126 connecting the first surface 122 and the second surface 124. The second surface 124 is disposed between the reflective display unit 140 and the first surface 122. The first surface 122 is disposed between the second surface 124 and the reflective polarizer 150. The light sources 110 are respectively disposed beside the incident surfaces 126. The illumination beams IL enter the light guide plate 120 through the incident surfaces 126. Moreover, FIG. 1 illustrates two light sources 110 and two incident surfaces 126, but the invention is not limited thereto. In another embodiment, the display module 100 may include three, four or more light sources 110/incident surfaces 126. Furthermore, the material of the light guide plate 120 is a transparent material, e.g., plastic or glass.

In this embodiment, the reflective element 130 is connected to the light guide plate 120 and configured to change a propagation direction of at least one part of the illumination beams IL. The reflective element 130 is embedded within the light guide plate 120 close to the first surface 122 or disposed on the first surface 122. For example, FIG. 1 shows one part of the illumination beams IL are directly reflected to the reflective display unit 140 by the reflective element 130, while the other part of the illumination beams IL are first fully internally reflected to the reflective element 130 by the light guide plate 120 and then reflected to reflective display unit 140 by the reflective element 130.

Moreover, in this embodiment, the light guide plate 120 satisfies 0.1 µm≤H≤10000 µm, where H (referring to FIGS. 5-7) is a height of the light guide plate 120 along the second direction D2. The second direction D2 is a direction from the reflective display unit 140 toward the reflective polarizer 150.

In this embodiment, the reflective element 130 is a polarizing beam splitter (PBS) film and includes a plurality of reflective surfaces 132, and the reflective surfaces 132 reflect the illumination beams IL having a first polarization direction (for example, S/P polarization). That is, the PBS film reflects light having the first polarization direction and allows light having a second polarization direction to pass through, and the second polarization direction is perpendicular to the first polarization direction. For example, the first polarization direction is S/P polarization and the second polarization direction is P/S polarization.

In this embodiment, the PBS film includes a plurality of optical coating layers stacked on each other, and a refractive index of each optical coating layer is greater than or equal to 1. The materials of the optical coating layers may include titanium oxide (e.g. $TiO_2$ or $Ti_3O_5$), tantalum oxide (e.g. $Ta_2O_5$), silicon oxide (e.g. $SiO_2$), aluminum oxide (e.g. $Al_2O_3$), magnesium oxide (MgO), or a combination thereof. The number of optical coating layers could be 2-100.

In this embodiment, each reflective surface 132 includes a first reflective surface 132-1 and a second reflective surface 132-2 facing toward two opposite incident surfaces 126 respectively. F For example, the first reflective surface 132-1 is configured to reflect the illumination beams IL emitted from right light source 110 in FIG. 1, and the second reflective surface 132-2 is configured to reflect the illumination beams IL emitted from left light source 110 in FIG. 1.

Moreover, in this embodiment, the reflective element 130 satisfies 0.01 µm≤P≤5000 µm, where P (referring to FIGS. 5-7) is a pitch of the reflective surfaces 132 along a first direction D1. The first direction D1 is parallel to a direction in which the illumination beams IL emitted from the light sources 110.

In this embodiment, the reflective display unit 140 is capable of modulating a polarization state of the illumination beams IL to form modulated beams M. For example, the reflective display unit 140 converts the polarization state of the illumination beams IL from S/P polarization to P/S polarization. The reflective display unit 140 may be a micro-display. In this embodiment, the reflective display unit 140 is a liquid-crystal-on-silicon (LCOS) panel. In other embodiments, the reflective unit 140 may be a micro-electromechanical system (MEMS) display, for example, a digital micro-mirror device (DMD). Moreover, the reflective display unit 140 may include a substrate 142, pixelized Aluminum (Al) mirrors 144, a (optional) liquid crystal 146, and transparent electrodes 148. The pixelized Al mirrors 144 are disposed between the substrate 142 and the liquid crystal 146, and the liquid crystal 146 is disposed between the transparent electrodes 148 and pixelized Al mirrors 144. Furthermore, the transparent electrodes 148 may be an ITO (Indium Tin Oxide) glass.

In this embodiment, the reflective polarizer 150 is disposed on the first surface 122, and the reflective polarizer 150 filters the modulated beams M into an image beam IB. The reflective polarizer 150 reflects lights with the first polarization direction, and allows lights with the second polarization direction to penetrate through. That is, the modulated beams M reflected by the reflective display unit 140 sequentially pass through the second surface 124 of the light guide plate 120, the reflective element 130, the first surface 122 of the light guide plate 120 and the reflective polarizer 150 to form the image beam IB. Thus, the reflective polarizer 150 on the top of the light guide plate 120 could act as a clear up polarizer, which could improve the contrast ratio of the device.

In this embodiment, the display module 100 further includes a medium layer 160. The medium layer 160 is disposed between the light guide plate 120 and reflective display unit 140, wherein a refractive index of the medium layer 160 is greater than or equal to 1. In one embodiment, the medium layer 160 could be an air layer. In another embodiment, the refractive index of the medium layer 160 may be equal to a refractive index of the light guide plate 120 or a refractive index of the transparent electrodes 148.

In yet another embodiment, the light guide plate 120, the medium layer 160 and the transparent electrodes 148 may be formed in one piece.

Based on the foregoing, the display module 100 in the embodiments includes a plurality of light sources 110, a light guide plate 120, a reflective element 130, a reflective display unit 140, and a reflective polarizer 150. The light sources 110 are configured to provide a plurality of illumination beams IL. The light guide plate 120 has a first surface 122, a second surface 124 opposite to the first surface 122, and a plurality of incident surfaces 126 connecting the first surface 122 and the second surface 124. The illumination beams IL enter the light guide plate 120 through the incident surfaces 126. That is, the display module 100 is provided at least two light sources to illuminate the same display area. Thus, the absolute brightness of the display module 100 could be higher. Moreover, since one light source 110 and its opposite light source 110 plays a role of reflector to each other, the light efficiency of the display module 110 are also improved. Furthermore, since the light efficiency of the display module 100/light-emitting device 112 is higher, the power of the display module 100/light-emitting device 112 could be decreased (because the higher light efficiency, the lower power), so that the thermal management of the display module 100 is also improved.

Figure 2:
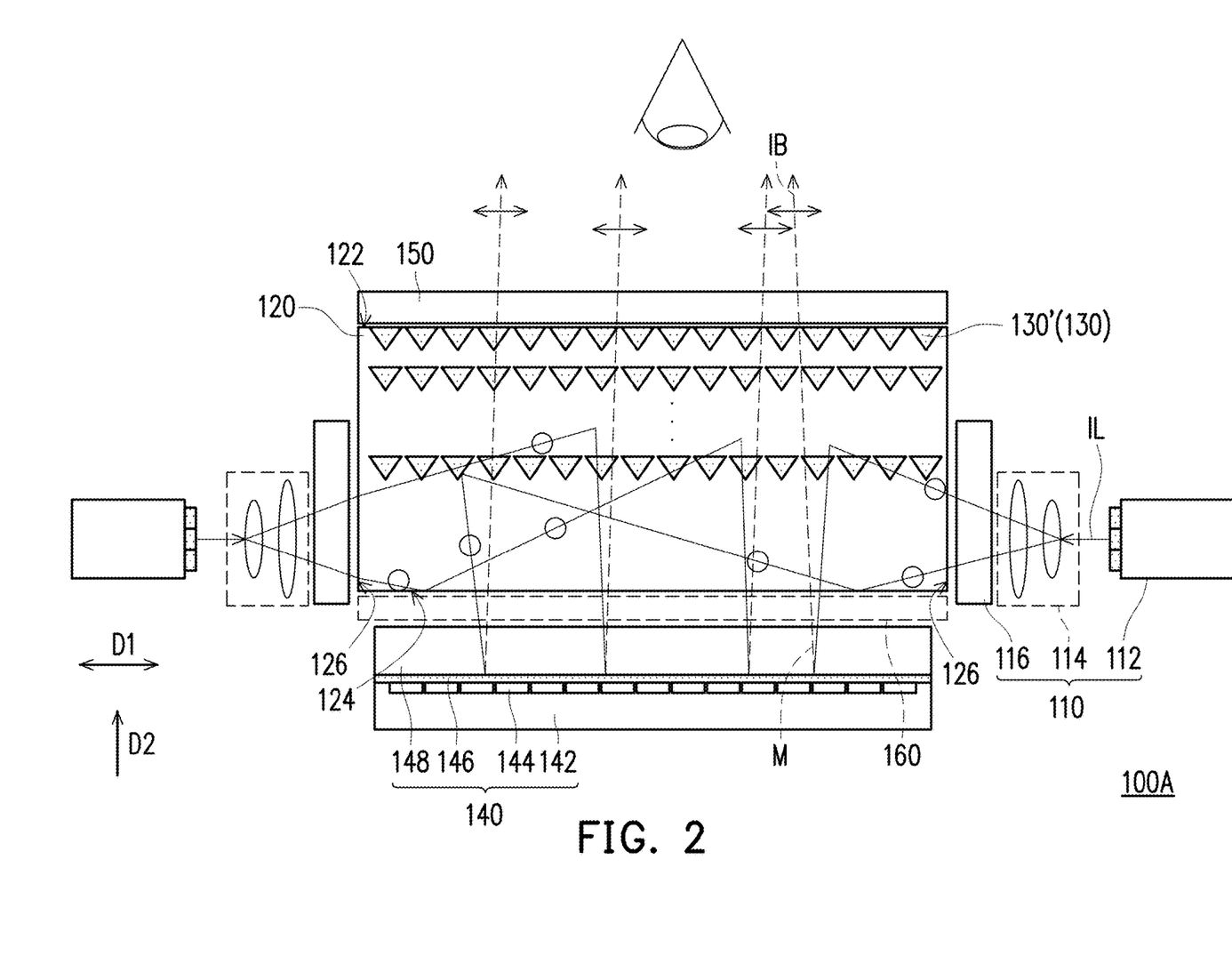
FIG. 2 is a schematic cross-sectional view of a display module according to a second embodiment of the invention.
Figure 3:
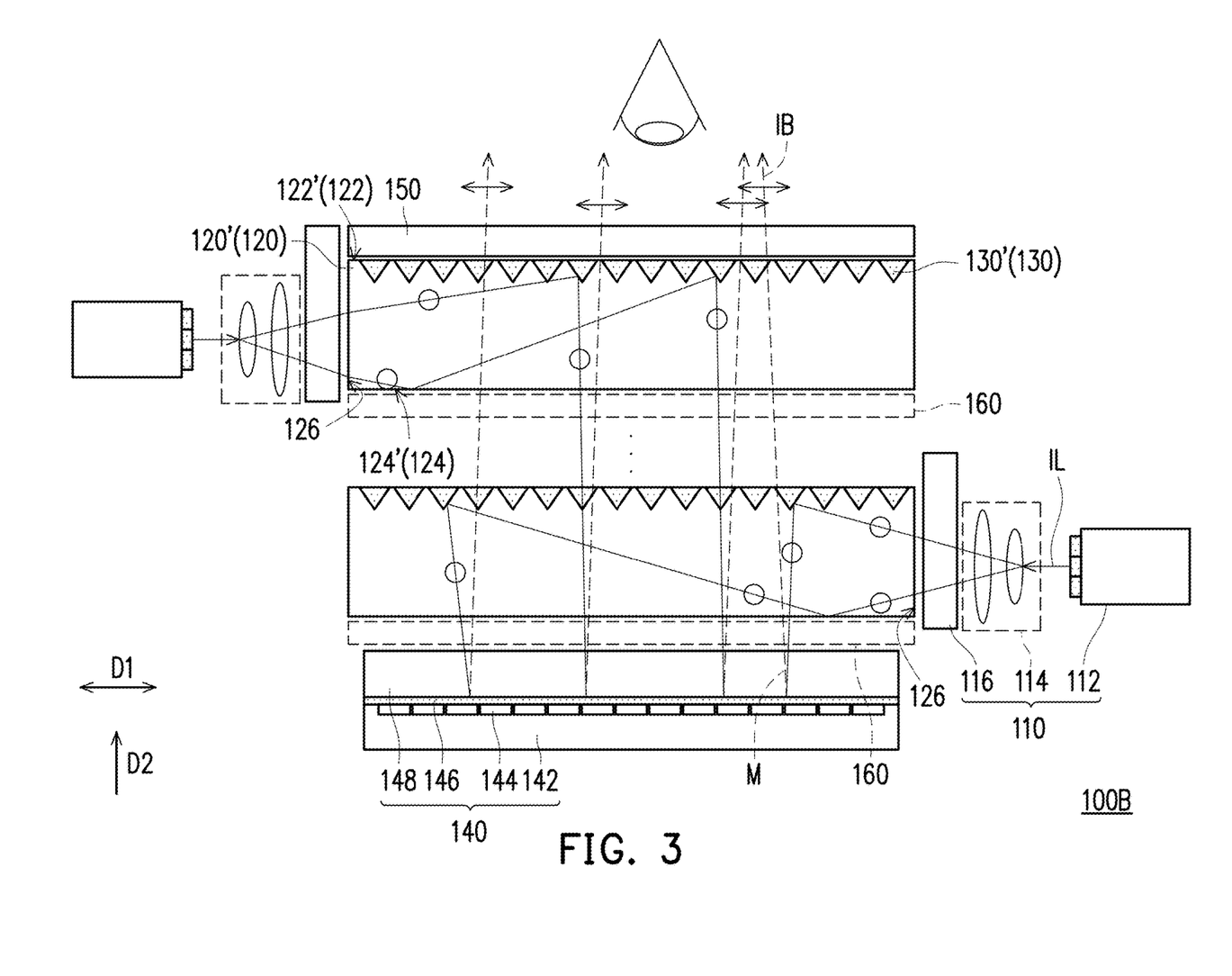
FIG. 3 is a schematic cross-sectional view of a display module according to a third embodiment of the invention.

FIG. 2 is a schematic cross-sectional view of a display module according to a second embodiment of the invention. Referring to FIG. 2, the display module 100A in this embodiment is similar to the display module 100 in FIG. 1, and the main difference therebetween is as follows. In the display module 100A, the reflective element 130 includes a plurality of sub-reflective elements 130'. The sub-reflective elements 130' are arranged along the second direction D2, and the sub-reflective elements 130' are embedded within the light guide plate 120 or disposed on the first surface 122. That is, the sub-reflective elements 130' stack together could improve the beam steering efficiency, thus the light efficiency of the display module 100A are improved FIG. 3 is a schematic cross-sectional view of a display module according to a third embodiment of the invention. Referring to FIG. 3, the display module 100B in this embodiment is similar to the display module 100 in FIG. 1, and the main difference therebetween is as follows. In the display module 100B, the light guide plate 120 includes a plurality of sub-light guide plate 120' arranged along a second direction D2, and the reflective element 130 includes a plurality of sub-reflective elements 130'. Specifically, the first surface 122 includes a plurality of sub-first surface 122', and the second surface 124 includes a plurality of sub-second surface 124'. Each sub-light guide plate 120' has one first surface 122', one second surface 124' opposite to the one first surface 122', and at least one of the incident surfaces 126 connecting the one first surface 122' and the one second surface 124'. Moreover, each sub-reflective element 130' is embedded within one of the sub-light guide plate 120' close to the sub-first surface 122' of the one of the sub-light guide plate 120' or disposed on the sub-first surface 122' of the one of the sub-light guide plate 120'.

In this embodiment, the light sources 110 are respectively disposed beside the incident surfaces 126. Different light sources 110 could provide different colors of illumination beams IL. For example, one light source 110 could provide red-color illumination beam IL, another one light source 110 could provide green-color illumination beam IL, and yet another one light source 110 could provide blue-color illumination beam IL, but the invention is not limited thereto.

Furthermore, in this embodiment, the light guide plate 120 satisfies 0.1 μm≤H≤ 10000 μm, where H is a height of each sub-light guide plate 120' along the second direction D2.

Figure 4:
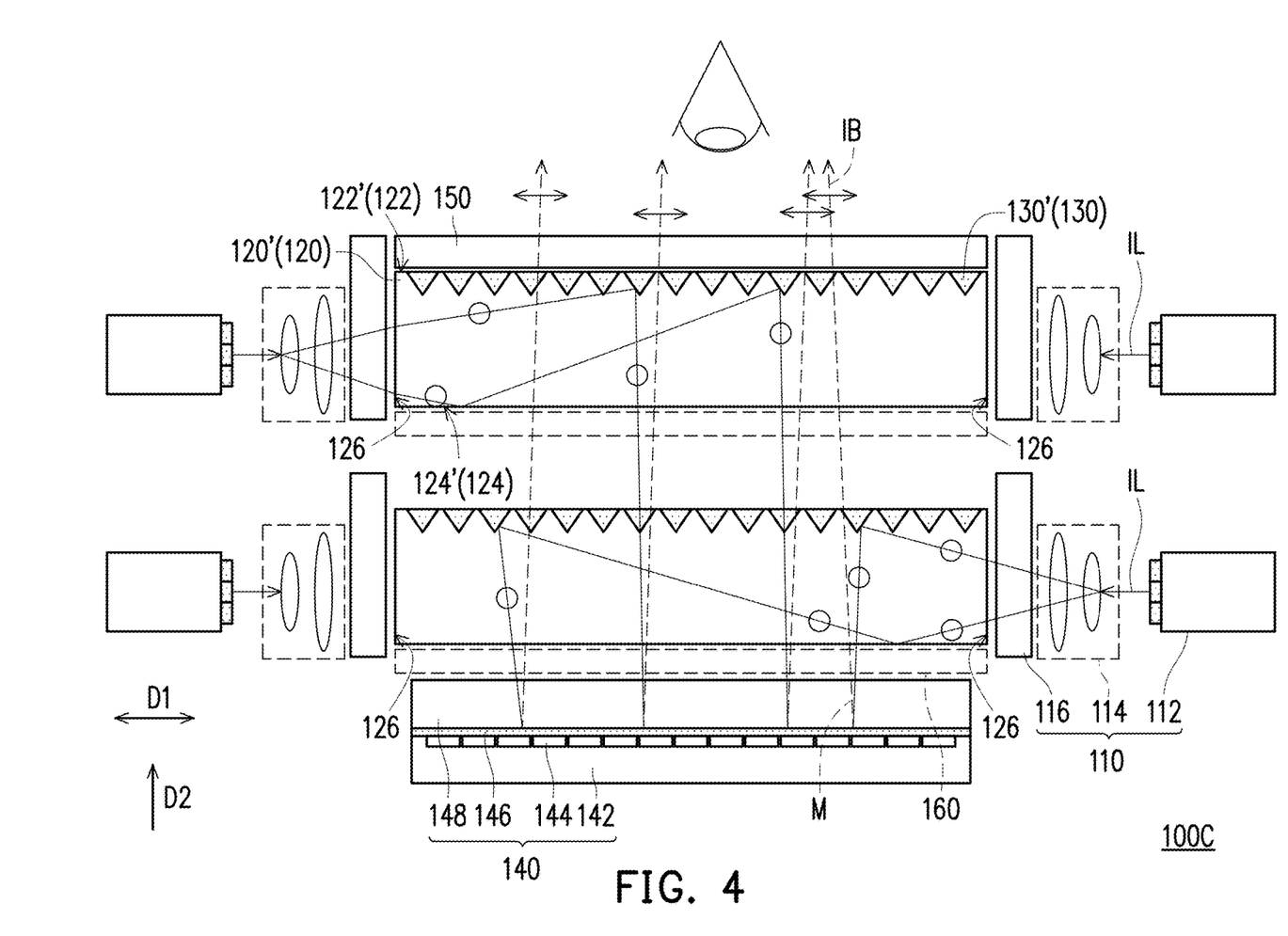
FIG. 4 is a schematic cross-sectional view of a display module according to a fourth embodiment of the invention.

FIG. 4 is a schematic cross-sectional view of a display module according to a fourth embodiment of the invention. Referring to FIG. 4, the display module 100C in this embodiment is similar to the display module 100B in FIG. 3, and the main difference therebetween is as follows. In the display module 100C, each sub-light guide plate 120' has multiple incident surfaces 126 connecting one first surface 122' and one second surface 124'.

Figure 5:
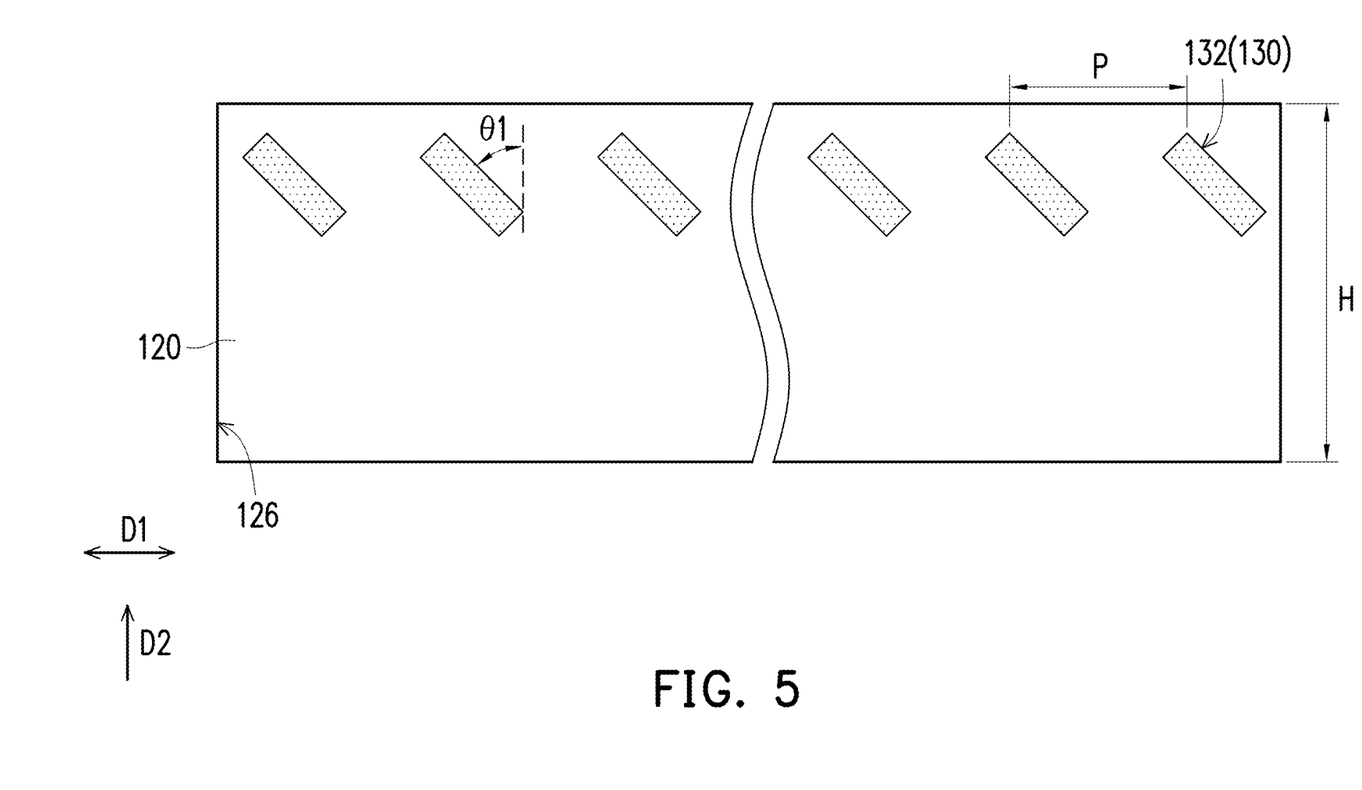
FIG. 5 is a schematic cross-sectional view of a display module according to a fifth embodiment of the invention.

FIG. 5 is a schematic cross-sectional view of a display module according to a fifth embodiment of the invention. FIG. 5 only illustrates the light guide plate 120 and the reflective element 130 in the display module and omits the remaining components of the display module. Referring to FIG. 5, the display module in this embodiment is similar to the display module 100 in FIG. 1, and the main difference therebetween is as follows. In this display module, the reflective surfaces 132 satisfies 0 degree <θ1<90 degrees, where θ1 is an angle between the reflective surfaces 132 and the second direction D2.

Figure 6:
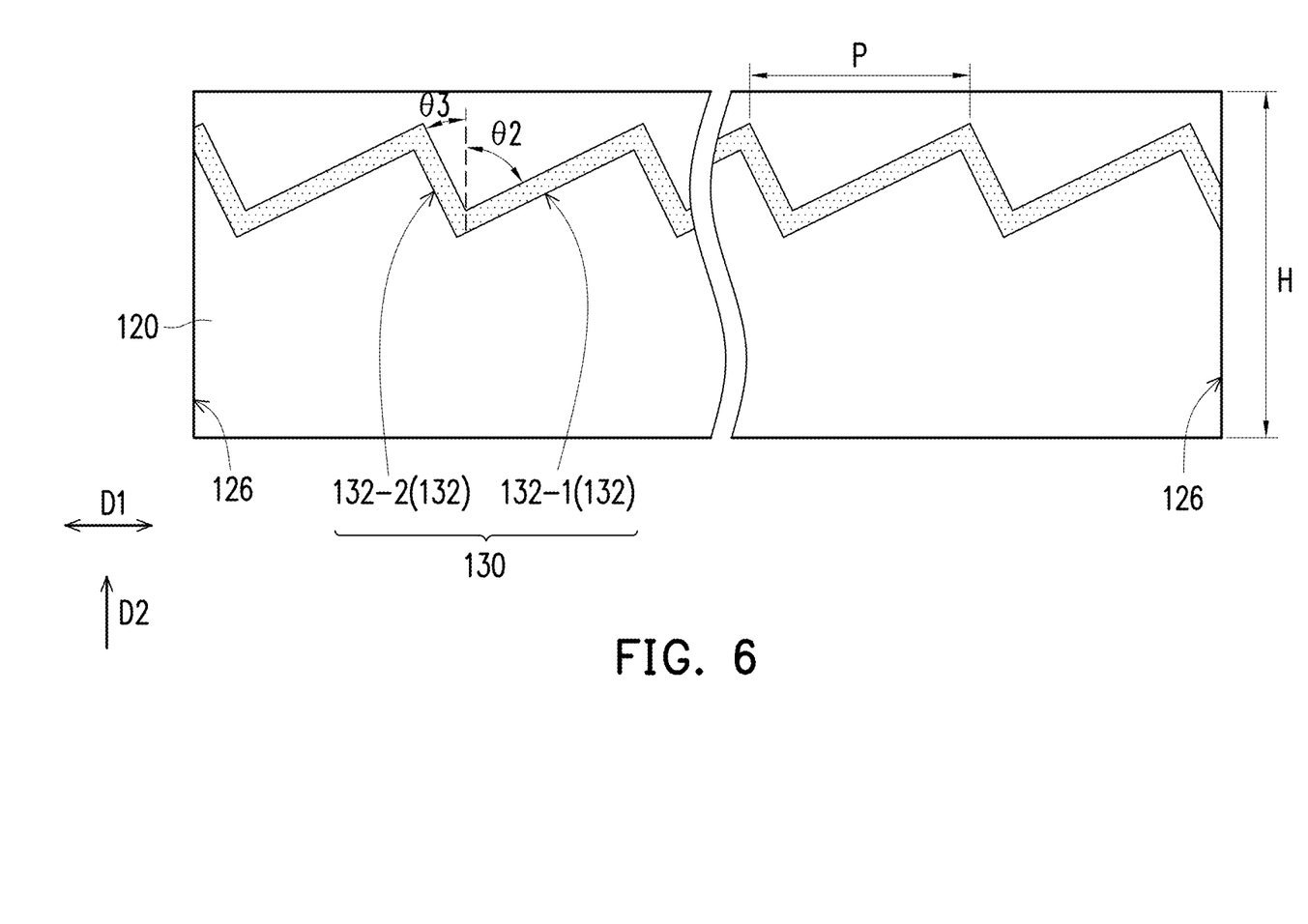
FIG. 6 is a schematic cross-sectional view of a display module according to a sixth embodiment of the invention.

FIG. 6 is a schematic cross-sectional view of a display module according to a sixth embodiment of the invention. Similarly, FIG. 6 only illustrates the light guide plate 120 and the reflective element 130 in the display module and omits the remaining components of the display module. Referring to FIG. 6, the display module in this embodiment is similar to the display module 100 in FIG. 1, and the main difference therebetween is as follows. In this display module, each reflective surface 132 includes a first reflective surface 132-1 and a second reflective surface 132-2 facing toward two opposite incident surfaces 126 respectively. Moreover, the reflective surfaces 132 satisfies 0 degree <θ2<90 degrees and 0 degree <θ3<90 degrees, where θ2 is an angle between the first reflective surface 132-1 and the second direction D2, and θ3 is an angle between the second reflective surface 132-2 and the second direction D2.

Figure 7:
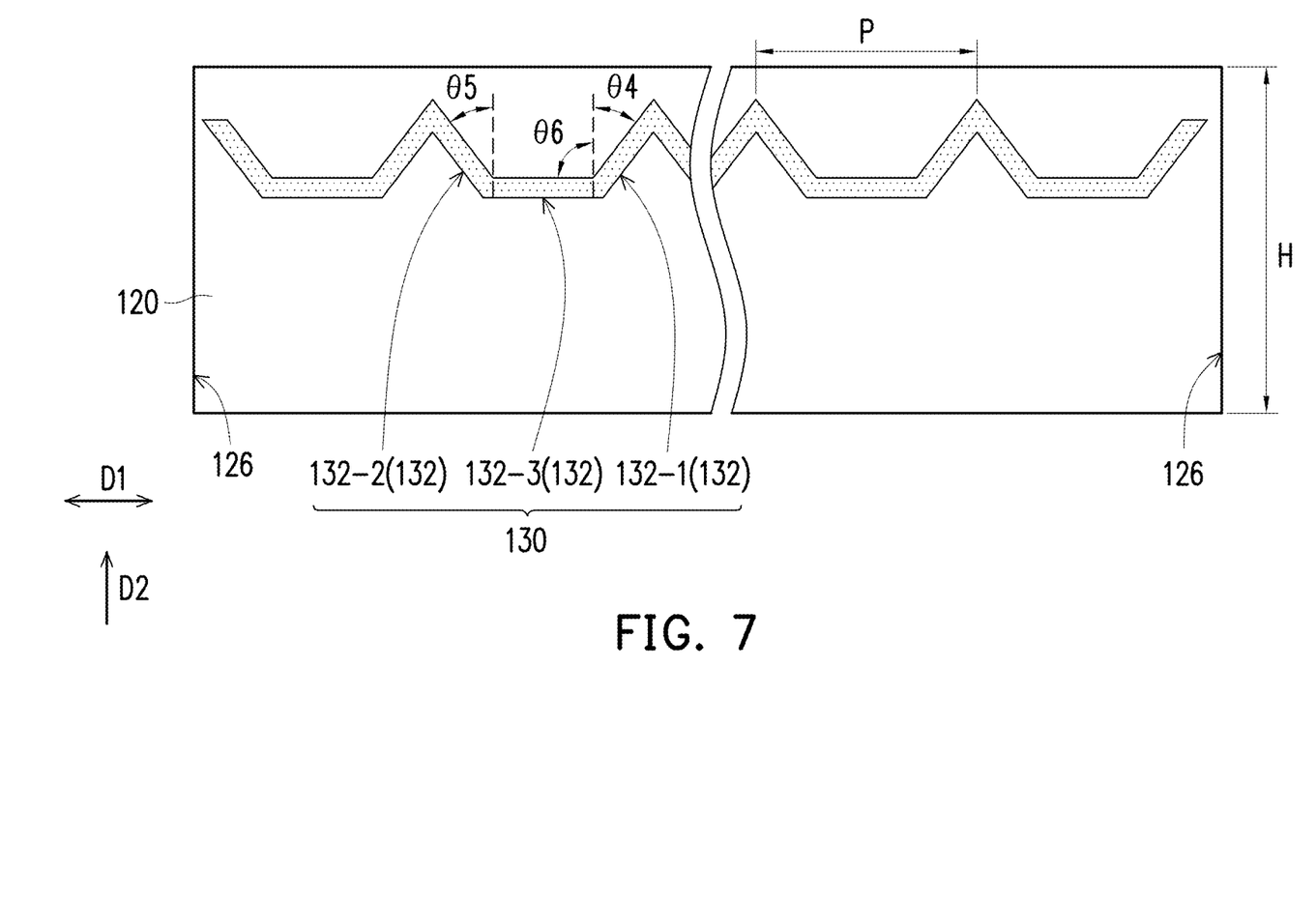
FIG. 7 is a schematic cross-sectional view of a display module according to a seventh embodiment of the invention.

FIG. 7 is a schematic cross-sectional view of a display module according to a seventh embodiment of the invention. Similarly, FIG. 7 only illustrates the light guide plate 120 and the reflective element 130 in the display module and omits the remaining components of the display module. Referring to FIG. 7, the display module in this embodiment is similar to the display module in FIG. 6, and the main difference therebetween is as follows. In this display module, each reflective surface 132 includes a first reflective surface 132-1, a second reflective surface 132-2 and a third reflective surface 132-3. The first reflective surface 132-1 and the second reflective surface 132-2 face toward two opposite incident surfaces 126 respectively, and the third reflective surface 132-3 is connected between the first reflective surface 132-1 and the second reflective surface 132-2. Moreover, the reflective surfaces 132 satisfies 0 degree <θ4<90 degrees, 0 degree <θ5<90 degrees and 0 degree ≤θ6≤180 degrees, where θ4 is an angle between the first reflective surface 132-1 and the second direction D2, θ5 is an angle between the second reflective surface 132-2 and the second direction D2, and θ6 is an angle between the third reflective surface 132-3 and the second direction D2. For example, the third reflective surface 132-3 is a horizontal surface parallel to the first direction D1 if θ6=90 degrees. The third reflective surface 132-3 is the extension of the first reflective surface 132-1 if θ6=180 degrees—θ4, the third reflective surface 132-3 is the extension of the second reflective surface 132-2 if θ6=θ5, and the reflective element 130 in FIG. 7 could reduce to the reflective element 130 in FIG. 6.

In conclusion, the display module in the embodiments includes a plurality of light sources, a light guide plate, a reflective element, a reflective display unit, and a reflective polarizer. The light sources are configured to provide a plurality of illumination beams, and the illumination beams enter the light guide plate through the incident surfaces. That is, the display module is provided at least two light sources to illuminate the same display area. Thus, the absolute brightness of the display module could be higher. Moreover, since one light source and its opposite light source plays a role of reflector to each other, the light efficiency of the display module are also improved. Furthermore, since the light efficiency of the display module/light source is higher, the power of the display module/light source could be decreased (because the higher light efficiency, the lower power), so that the thermal management of the display module is also improved. In other words, the display module costs less power to reach the illumination requirement.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display module, comprising:
a plurality of light sources, configured to provide a plurality of illumination beams;
a light guide plate, having a first surface, a second surface opposite to the first surface, and a plurality of incident surfaces connecting the first surface and the second surface, the illumination beams entering the light guide plate through the incident surfaces;
a reflective element, connected to the light guide plate and configured to change a propagation direction of at least one part of the illumination beams, the reflective element is a polarizing beam splitter (PBS) film and comprises a plurality of reflective surfaces, and the reflective surfaces reflect the illumination beams having a first polarization direction;
a reflective display unit, capable of modulating a polarization state of the illumination beams to form modulated beams, the second surface being disposed between the reflective display unit and the first surface; and
a reflective polarizer, wherein the first surface being disposed between the second surface and the reflective polarizer, the reflective polarizer filtering the modulated beams into an image beam,
wherein the reflective element comprises a plurality of sub-reflective elements arranged along a second direction, the sub-reflective elements are embedded within the light guide plate or disposed on the first surface, where the second direction is a direction from the reflective display unit toward the reflective polarizer.

2. The display module according to claim 1, wherein the PBS film reflects light having the first polarization direction and allows light having a second polarization direction to pass through, and the second polarization direction is perpendicular to the first polarization direction.

3. The display module according to claim 1, wherein the reflective element satisfies 0.01 μm≤P≤5000 μm, where P is a pitch of the reflective surfaces along a first direction and the first direction is parallel to a direction in which the illumination beams emitted from the light sources.

4. The display module according to claim 1, wherein the PBS film comprises a plurality of optical coating layers, and a refractive index of each optical coating layer is greater than or equal to 1.

5. The display module according to claim 1, wherein the reflective surfaces satisfies 0 degree <θ1<90 degrees, where θ1 is an angle between the reflective surfaces and the second direction.

6. The display module according to claim 1, wherein each reflective surface comprises a first reflective surface and a second reflective surface facing toward two opposite incident surfaces respectively,
wherein the reflective surfaces satisfies 0 degree <θ2<90 degrees and 0 degree <θ3<90 degrees, where θ2 is an angle between the first reflective surface and the second direction, and θ3 is an angle between the second reflective surface and the second direction.

7. The display module according to claim 1, wherein each reflective surface comprises a first reflective surface, a second reflective surface and a third reflective surface, the first reflective surface and the second reflective surface face toward two opposite incident surfaces respectively, and the third reflective surface is connected between the first reflective surface and the second reflective surface,
wherein the reflective surfaces satisfies 0 degree <θ4<90 degrees, 0 degree <θ5<90 degrees and 0 degree≤θ6≤180 degrees, where θ4 is an angle between the first reflective surface and the second direction, θ5 is an angle between the second reflective surface and the second direction, and θ6 is an angle between the third reflective surface and the second direction.

8. The display module according to claim 1, wherein the reflective element is embedded within the light guide plate close to the first surface or disposed on the first surface.

9. The display module according to claim 1, wherein the light guide plate comprises a plurality of sub-light guide plate arranged along the second direction,
wherein the first surface comprises a plurality of sub-first surface, the second surface comprises a plurality of sub-second surface, each sub-light guide plate has one first surface, one second surface opposite to the one first surface, and at least one of the incident surfaces connecting the one first surface and the one second surface,
wherein each sub-reflective element is embedded within one of the sub-light guide plate or disposed on the sub-first surface of the one of the sub-light guide plate,
wherein the light sources is respectively disposed beside the incident surfaces.

10. The display module according to claim 9, wherein the light guide plate satisfies 0.1 μm≤H≤10000 μm, where H is a height of each sub-light guide plate along the second direction.

11. The display module according to claim 1, further comprising:
a medium layer, disposed between the light guide plate and reflective display unit, wherein a refractive index of the medium layer is greater than or equal to 1.

12. The display module according to claim 11, wherein the refractive index of the medium layer is equal to a refractive index of the light guide plate.

* * * * *